US010768381B2

(12) United States Patent
Li

(10) Patent No.: US 10,768,381 B2
(45) Date of Patent: Sep. 8, 2020

(54) LC DUPLEX CONNECTOR

(71) Applicant: Shenzhen Fibercan Optical Co., Ltd, Guangdong (CN)

(72) Inventor: Yaole Li, Guangdong (CN)

( * ) Notice: Subject to any disclaimer, the term of this patent is extended or adjusted under 35 U.S.C. 154(b) by 0 days.

(21) Appl. No.: 16/492,628

(22) PCT Filed: Jun. 14, 2017

(86) PCT No.: PCT/CN2017/088242
§ 371 (c)(1),
(2) Date: Sep. 10, 2019

(87) PCT Pub. No.: WO2018/192079
PCT Pub. Date: Oct. 25, 2018

(65) Prior Publication Data
US 2020/0049902 A1  Feb. 13, 2020

(30) Foreign Application Priority Data

Apr. 17, 2017 (CN) .......................... 2017 1 0249926

(51) Int. Cl.
*G02B 6/38* (2006.01)
*H01R 13/506* (2006.01)
*H01R 13/633* (2006.01)

(52) U.S. Cl.
CPC ......... *G02B 6/3879* (2013.01); *G02B 6/3825* (2013.01); *G02B 6/3858* (2013.01);
(Continued)

(58) Field of Classification Search
CPC .. G02B 6/3879; G02B 6/3825; G02B 6/3858; G02B 6/3885; G02B 6/3893; G02B 6/36; H01R 13/506; H01R 13/6335
See application file for complete search history.

(56) References Cited

U.S. PATENT DOCUMENTS 9,678,283 B1 *  6/2017  Chang .................. G02B 6/3885
9,869,825 B2 *  1/2018  Bailey .................. G02B 6/3879
(Continued)

FOREIGN PATENT DOCUMENTS

CN        203786334 U  *  8/2014
CN        205620583 U  *  10/2016

OTHER PUBLICATIONS

International preliminary report on patentability/IPRP dated Oct. 22, 2019 for PCT international application No. PCT/CN2017/088242 (Year: 2019).*

*Primary Examiner* — Andrew Jordan
(74) *Attorney, Agent, or Firm* — Prakash Nama; Global IP Services, PLLC

(57) ABSTRACT

An LC duplex connector having an intermediate panel and a pulling rod; a first through hole and a second through hole are provided on an upper cover panel and a lower cover panel respectively; an elastic arm is provided on the intermediate panel; the elastic arm is inserted into the first and second through holes to fix the intermediate panel with respect to the upper and lower cover panels; the pull rod is installed on the intermediate panel and is axially slidable; the press strip is provided with a reverse hook; the pull rod is provided with pulling hooks each being cooperative with a corresponding reverse hook. When pulling the pull rod, the pulling hooks of the pull rod apply a downward force against the reverse hooks, thus driving the press strips to move downwardly to disengage the LC duplex connector from the concealed fasteners of the LC adaptors.

10 Claims, 4 Drawing Sheets

(52) U.S. Cl.
CPC ......... *G02B 6/3885* (2013.01); *G02B 6/3893* (2013.01); *H01R 13/506* (2013.01); *H01R 13/6335* (2013.01)

(56) References Cited

U.S. PATENT DOCUMENTS

| | | | |
|---|---|---|---|
| 10,222,556 B2* | 3/2019 | Nguyen | G02B 6/3817 |
| 10,520,687 B2* | 12/2019 | Lee | G02B 6/3869 |
| 10,620,384 B2* | 4/2020 | Iizumi | G02B 6/3893 |
| 10,641,972 B2* | 5/2020 | Wong | G02B 6/3871 |
| 2013/0301994 A1* | 11/2013 | Motofuji | G02B 6/36 385/78 |
| 2015/0177463 A1* | 6/2015 | Lee | G02B 6/387 385/76 |
| 2017/0123167 A1* | 5/2017 | Isenhour | G02B 6/3895 |
| 2017/0205590 A1* | 7/2017 | Bailey | G02B 6/3885 |
| 2017/0343740 A1* | 11/2017 | Nguyen | G02B 6/428 |
| 2018/0314014 A1* | 11/2018 | Irwin | G02B 6/3887 |
| 2019/0170949 A1* | 6/2019 | Collier | G02B 6/02 |
| 2019/0235181 A1* | 8/2019 | Chang | G02B 6/3857 |
| 2019/0235184 A1* | 8/2019 | Takano | G02B 6/3821 |
| 2019/0302383 A1* | 10/2019 | Takano | G02B 6/4292 |
| 2020/0003963 A1* | 1/2020 | Iizumi | G02B 6/3893 |
| 2020/0018907 A1* | 1/2020 | Li | G02B 6/3849 |
| 2020/0049897 A1* | 2/2020 | Li | G02B 6/3806 |
| 2020/0049902 A1* | 2/2020 | Li | G02B 6/3858 |
| 2020/0053901 A1* | 2/2020 | Li | H05K 7/1487 |
| 2020/0064564 A1* | 2/2020 | Ho | G02B 6/3847 |
| 2020/0096716 A1* | 3/2020 | Takano | G02B 6/3885 |

\* cited by examiner

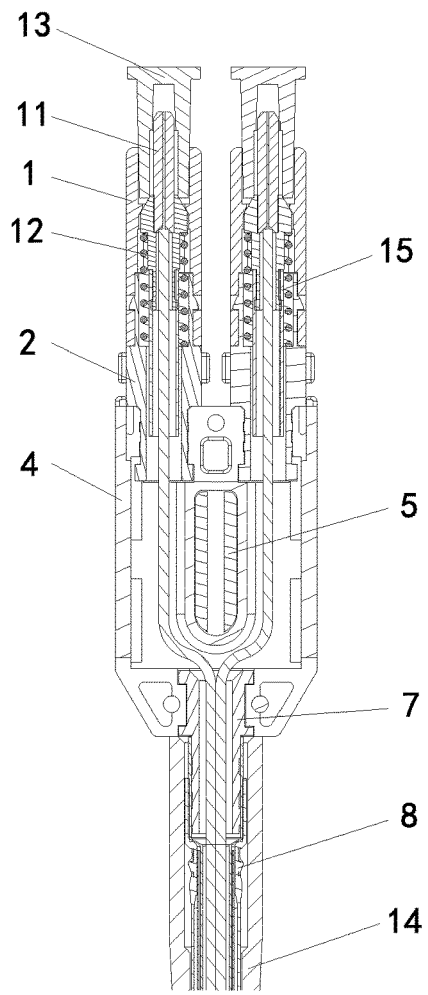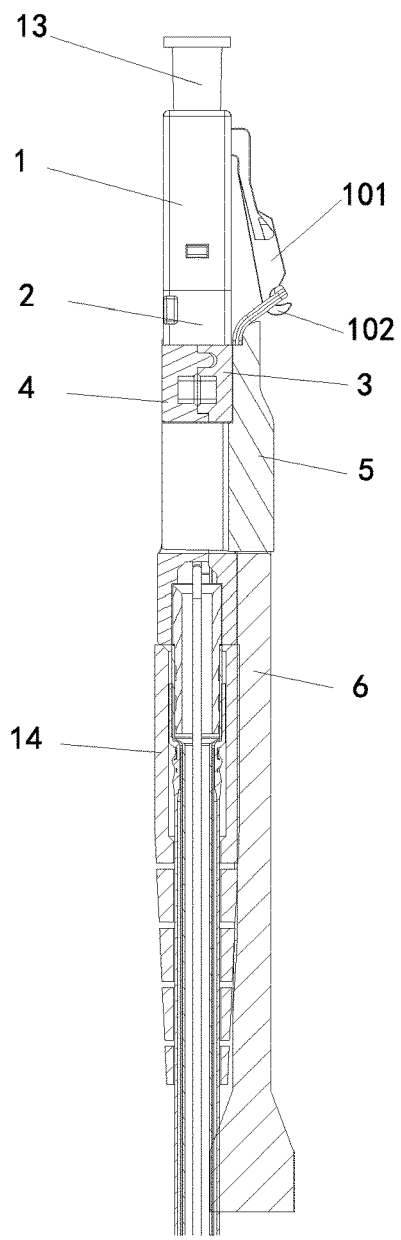
Fig. 3
Fig. 4
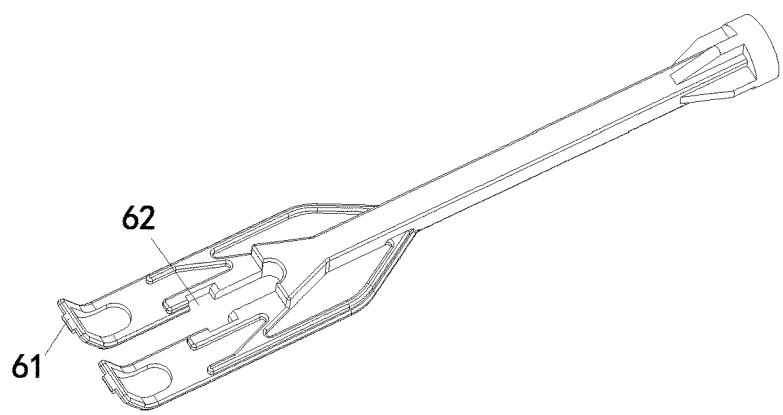
Fig. 5

LC DUPLEX CONNECTOR

BACKGROUND OF THE INVENTION

The present invention relates to the technical field of optical fiber communication, and more specifically relates to an LC duplex connector.

LC connector is a kind of optical fiber coupler. The LC connector according to the prior art is provided with a press strip and a fastening point on the press strip. The LC connector is fixed with an LC adaptor via a concealed fastener. If it is desired to disconnect the connected LC connector and the LC adaptor, the user is required to press the press strip of the LC connector by using a finger before the LC connector can be removed. Therefore, when LC connectors and LC adaptors are installed on a cabinet panel, LC connectors and LC adaptors installed on an upper row of the cabinet panel have to be spaced apart by a certain distance from the LC connectors and LC adaptors installed on a bottom row, so that sufficient space is allowed for the fingers of the user to press the press strips of the LC connectors to loosen the fasteners so as to remove the LC connectors. Accordingly, utility of the surface area provided by the cabinet panel is ineffective, thereby increasing the cost of the equipment. Also, the above configurations are inconvenient for removing and switching LC connectors, thereby affecting the operation efficiency,

BRIEF SUMMARY OF THE INVENTION

An object of the present invention is to provide a kind of LC duplex connector that can effectively increase the utility of the surface area provided by the cabinet panel, and which is easy to disassemble.

The present invention is achieved as follows:

An LC duplex connector, comprising front casings, rear casings, an upper cover panel and a lower cover panel; each of the front casings is provided with a press strip; a fastening point is provided on the press strip; the LC duplex connector also comprises an intermediate panel and a pull rod; a first through hole and a second through hole are provided on the upper cover panel and the lower cover panel respectively; an elastic arm corresponding to the first through hole and the second through hole is provided on the intermediate panel; the elastic arm is inserted into the first through hole and the second through hole so that the intermediate panel is fixed with respect to the upper cover panel and the lower cover panel; the pull rod is installed on the intermediate panel and is axially slidable; the press strip is provided with a reverse hook; the pull rod is provided with pulling hooks each being cooperative with a corresponding reverse hook.

The intermediate panel is also provided with a press block to prevent upward deflection of the pulling hooks during movement of the pulling hooks; a surface of the press block in contact with the pulling hooks has a curved shape.

The intermediate panel is also provided with an abutment portion and a locking portion; the pull rod is also provided with a third through hole; the intermediate panel is inserted into the third through hole, so that the pull rod is connected between the abutment portion and the locking portion.

The rear casings are rotatably fixed between the upper cover panel and the lower cover panel; the LC duplex connector has only one tail sleeve.

First slots are defined by an inner side of the upper cover panel and an inner side of the lower cover panel; a tail part of each of the rear casings is a rotary part which is rotatably fixed to a corresponding first slot.

The LC duplex connector also comprises a stop ring, a crimp ring and a heat-shrink tube; a second slot is defined by the inner side of the upper cover panel and the inner side of the lower cover panel at an end of the inner side of the upper cover panel and at an end of the inner side of the lower cover panel opposite to the first slots; the stop ring is fixed inside the second slot; one end of the crimp ring is pressed against a tail part of the stop ring, another end of the crimp ring is pressed against an optical cable outer sheath; the heat-shrink tube sleeves the crimp ring and the optical cable; craft wires of the optical cable extend to positions between the stop ring and the crimp ring.

The LC duplex connector also comprises a stop ring, a crimp ring and a hollow metal tube; a second slot is defined by the inner side of the upper cover panel and the inner side of the lower cover panel at an end of the inner side of the upper cover panel 3 and at an end of the inner side of the lower cover panel opposite to the first slots; the stop ring is fixed in the second slot; the hollow metal tube is disposed between optical cable craft wires and a fiber core; one end of the crimp ring presses against a tail part of the stop ring, another end of the crimp ring presses against an optical cable outer sheath, the craft wires and the hollow metal tube; the craft wires extend to positions between the stop ring and the crimp ring.

The front casings are fixed with respect to the rear casings via grooves and projections; each of the front casings is provided with an insertion core inside; the insertion core comprises a ceramic sleeve tube and a tail; the ceramic sleeve tube positions and fixes an optical fiber core; the insertion core is pressed tightly against the front casing by a corresponding rear casing via a spring.

The upper cover panel is fixed with respect to the lower cover panel via grooves and projections.

The insertion core is sleeved with a dust proof cap.

On the basis of the teachings of the prior arts, the LC duplex connector according to the present invention has additionally provided the intermediate panel and the pulling rod; the first through hole and the second through hole are provided on the upper cover panel and the lower cover panel respectively; the elastic arm is provided on the intermediate panel; the elastic arm is inserted into the first through hole and the second through hole so that the intermediate panel is fixed with respect to the upper cover panel and the lower cover panel; the pull rod is installed on the intermediate panel and is axially slidable; the press strip is provided with a reverse hook; the pull rod is provided with pulling hooks each being cooperative with a corresponding reverse hook. When pulling the pull rod, the pulling hooks of the pull rod apply a downward force against the reverse hooks on the press strips, thus driving the press strips to move downwardly, so that the LC duplex connector is disengaged from the concealed fasteners of the LC adaptors, such that the LC duplex connector can be smoothly removed. Since it is not necessary to provide an operation space for a user's finger between an upper row of LC duplex connectors and LC adaptors and a bottom row of LC duplex connectors and LC adaptors, utility of the surface area provided by the cabinet panel is greatly increased, thereby lowering the equipment cost. Besides, the LC duplex connector can be removed from its corresponding LC adaptors and switched easily by simply pulling the pull rod, thereby facilitating quick and easy disassembly and enhancing operation efficiency.

BRIEF DESCRIPTION OF THE DRAWINGS

FIG. 3 is a longitudinal sectional view of the LC duplex connector of the present invention according to the first embodiment.

FIG. 4 is another cross sectional view of the LC duplex connector of the present invention according to the first embodiment.

FIG. 5 is a structural view of the pull rod of the LC duplex connector of the present invention according to the first embodiment.

Figure 1:
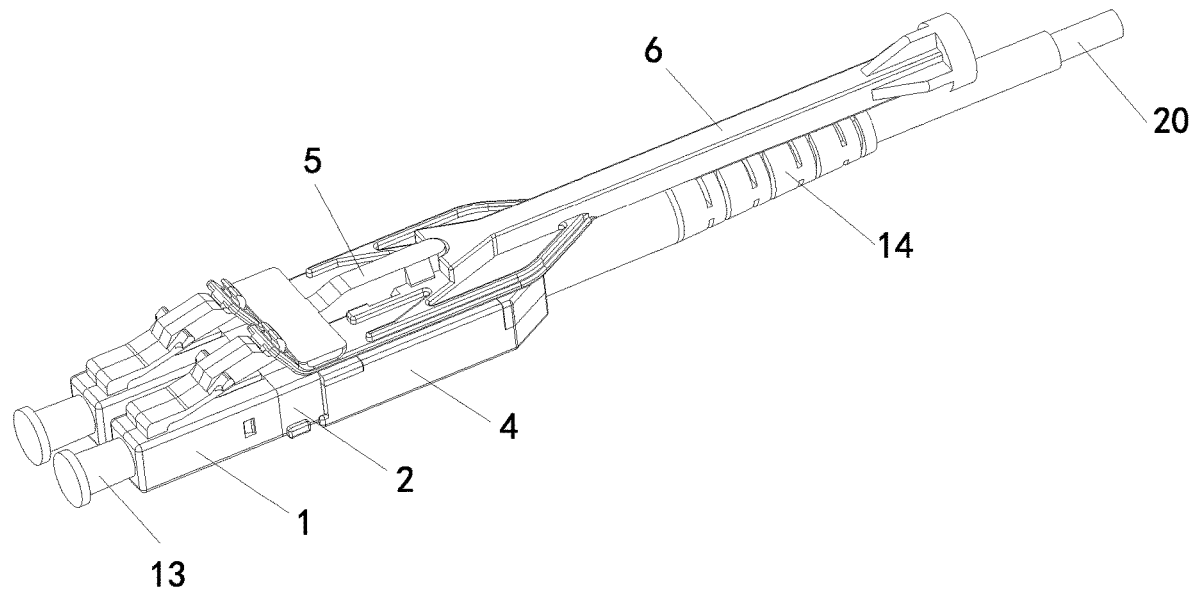
FIG. 1 is a schematic illustration of an overall structure of the LC duplex connector of the present invention according to the first embodiment.
Figure 2:
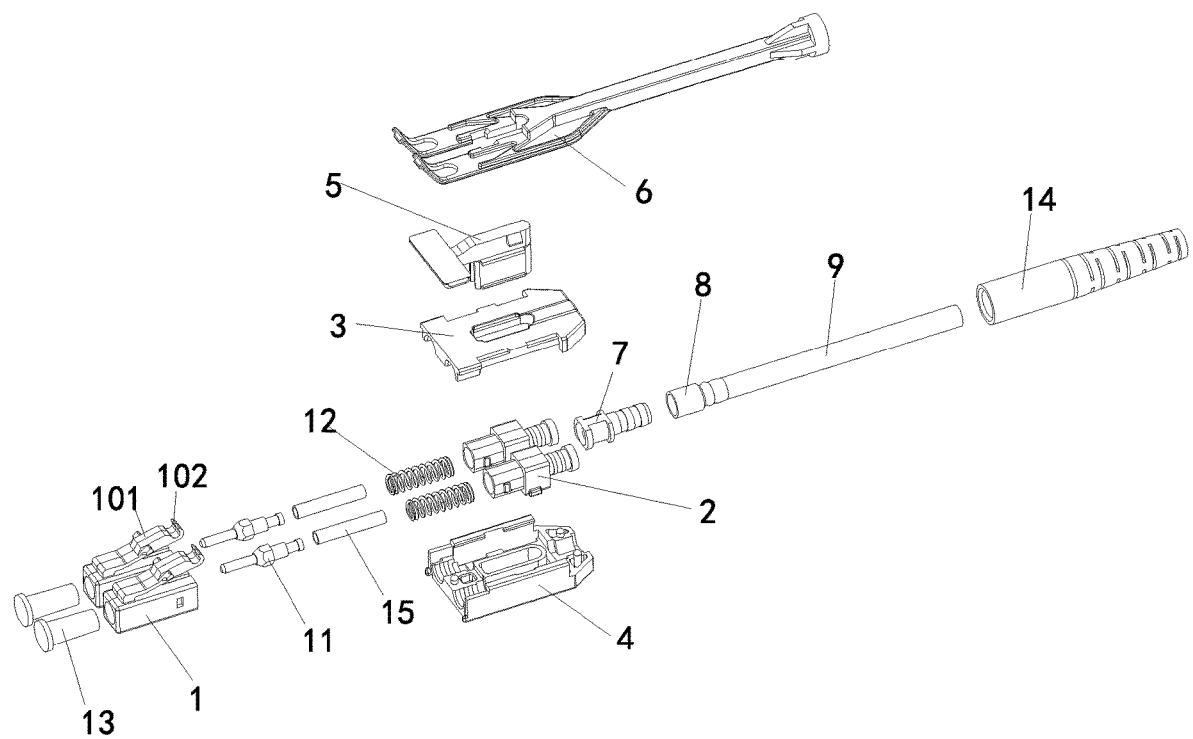
FIG. 2 is an exploded view of the LC duplex connector of the present invention according to the first embodiment.
Figure 6:
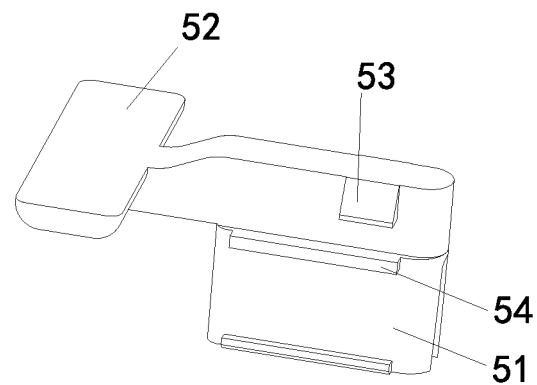
FIG. 6 is a structural view of the intermediate panel of the LC duplex connector of the present invention according to the first embodiment.
Figure 7:
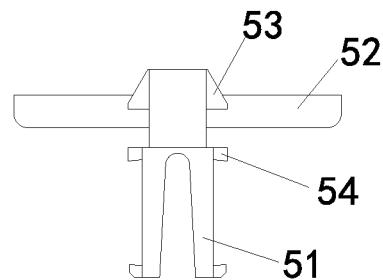
FIG. 7 is another structural view of the intermediate panel of the LC duplex connector of the present invention according to the first embodiment.
Figure 8:
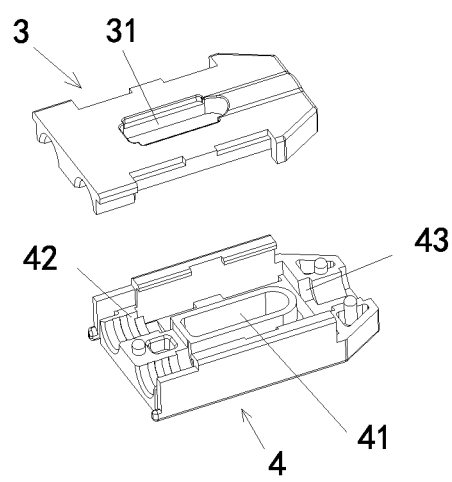
FIG. 8 is a structural view showing the cooperative relationships between the upper cover panel and the lower cover panel of the LC duplex connector of the present invention according to the first embodiment.
Figure 9:
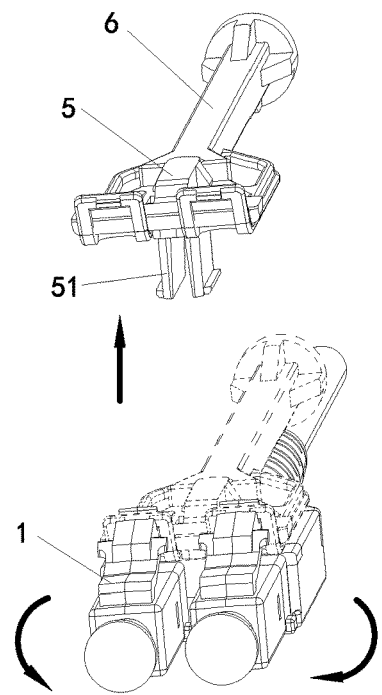
FIG. 9 is an illustration of disassembly during polarity switch of the LC duplex connector of the present invention according to the first embodiment.
Figure 10:
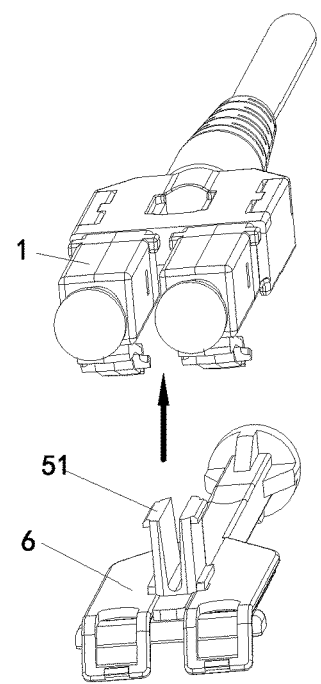
FIG. 10 is an illustration of installation during polarity switch of the LC duplex connector of the present invention according to the first embodiment.

REFERENCES IN THE FIGURES 1-front casings; 101-press strip; 102-reverse hook; 2-rear casings; 3-upper cover panel; 31-first through hole; 4-lower cover panel; 41-second through hole; 42-first slots; 43-second slot; 5-intermediate panel; 51-elastic arm; 52-press block; 53-abutment portion; 54-locking portion; 6-pull rod; 61-pulling hooks; 62-third through hole; 7-stop ring; 8-crimp ring; 9-heat-shrink tube; 10-hollow metal tube; 11-insertion core; 12-spring; 13-dust proof cap; 14-tail sleeve; 15-small white tube; 20-optical cable; 21-fiber core; 22-optical cable outer sheath; 23-craft wires.

DETAILED DESCRIPTION OF THE INVENTION

In order that the objects, technical solutions and advantages of the present invention are more clearly understood, the present invention will be described further in detail below with reference to some embodiments and the figures. It should be understood that, the embodiments as will be described are only intended to illustrate the present invention and are not intended to limit the present invention.

FIGS. 1-11 illustrate a first embodiment of the LC duplex connector according to the present invention, comprising front casings 1, rear casings 2, an upper cover panel 3 and a lower cover panel 4. Each of the front casings 1 is provided with a press strip 101; a fastening point (not shown in the figures, for fastening with the LC adaptors) is provided on the press strip 101; the LC duplex connector also comprises an intermediate panel 5 and a pull rod 6; a first through hole 31 and a second through hole 41 are provided on the upper cover panel 3 and the lower cover panel 4 respectively; an elastic arm 51 corresponding to the first through hole 31 and the second through hole 41 is provided on the intermediate panel 5; the elastic arm 51 is inserted into the first through hole 31 and the second through hole 41 so that the intermediate panel 5 is fixed with respect to the upper cover panel 3 and the lower cover panel 4; the pull rod 6 is installed on the intermediate panel 5 and is axially slidable; the press strip 101 is provided with a reverse hook 102; the pull rod 6 is provided with pulling hooks 61 each being cooperative with a corresponding reverse hook 102.

On the basis of the teachings of the prior arts, the LC duplex connector according to the present invention has additionally provided the intermediate panel 5 and the pulling rod 6; the first through hole 31 and the second through hole 41 are provided on the upper cover panel 3 and the lower cover panel 4 respectively; the elastic arm 51 is provided on the intermediate panel 5; the elastic arm 51 is inserted into the first through hole 31 and the second through hole 41 so that the intermediate panel 5 is fixed with respect to the upper cover panel 3 and the lower cover panel 4; the pull rod 6 is installed on the intermediate panel 5 and is axially slidable; the press strip 101 is provided with a reverse hook 102; the pull rod 6 is provided with pulling hooks 61 each being cooperative with a corresponding reverse hook 102. When pulling the pull rod 6, the pulling hooks 61 of the pull rod 6 apply a downward force against the reverse hooks 102 on the press strips 101, thus driving the press strips 101 to move downwardly, so that the LC duplex connector is disengaged from the concealed fasteners of the LC adaptors, such that the LC duplex connector can be smoothly removed. Since it is not necessary to provide an operation space for a user's finger between an upper row of LC duplex connectors and LC adaptors and a bottom row of LC duplex connectors and LC adaptors, utility of the surface area provided by the cabinet panel is greatly increased, thereby lowering the equipment cost. Besides, the LC duplex connector can be removed from its corresponding LC adaptor and switched easily by simply pulling the pull rod 6, thereby facilitating quick and easy disassembly and enhancing operation efficiency.

In the current embodiment, the intermediate panel 5 is also provided with an abutment portion 53 and a locking portion 54; the pull rod 6 is also provided with a third through hole 62; the intermediate panel 5 is inserted into the third through hole 62 so that the pull rod 6 is connected to the intermediate panel 5 between the abutment portion 53 and the locking portion 54 in a form of clearance fit such that the pull rod 6 is axially slidable. Softness of the pull rod 6 may affect the downward driving effect when the press strips 101 are driven downwardly because the pulling hooks 61 may be deflected upwardly as they drive the press strips 101 downwardly. In the current embodiment, the intermediate panel 5 is also provided with a press block 52 to prevent upward deflection of the pulling hooks 61 while moving; a surface of the press block 52 in contact with the pulling hooks 61 has a curved shape, therefore when pulling the pull rod 6, the pulling hooks 61 can generate even greater inclined downward driving force while not damaging the pull rod 6.

In the current embodiment, the front casings 1 are fixed with respect to the rear casings 2 via grooves and projections; each of the front casings 1 is provided with an insertion core 11 inside; the insertion core 11 comprises a ceramic sleeve tube and a tail; the ceramic sleeve tube is used for positioning and fixing an optical fiber core; the insertion core 11 is pressed tightly against the front casing 1 by a corresponding rear casing 2 via a spring 12; the upper cover panel 3 is fixed with respect to the lower cover panel 4 also via grooves and projections; the insertion core 11 is sleeve with a dust proof cap 13; a small white tube 15 is provided between the optical fiber core and the spring 12.

In some special circumstances, the LC duplex connector has to switch its polarities during use. In the prior arts, switching polarities requires the upper cover panel and the lower cover panel of the LC duplex connector to be disassembled and then the two connector heads being switched in position. However, since there is basically no gap between the upper cover panel and the lower cover panel after the upper cover panel and the lower cover panel are connected, it consumes much time and effort and it is quite difficult to disassemble the upper cover panel and the lower cover panel, and there is a possibility of damaging the LC duplex connector.

In order to solve the above problem of switching polarities in the prior arts, the LC duplex connector of the present invention has only one tail sleeve 14 (also known as LC uniboot connector); the rear casings 2 are rotatably fixed between the upper cover panel 3 and the lower cover panel 4; specifically, first slots 42 are defined by an inner side of the upper cover panel 3 and an inner side of the lower cover panel 4 (parts of the inner side of the upper cover panel 3 defining the first slots 42 are not shown); a tail part of each of the rear casings 2 is a rotary part which is rotatably fixed to a corresponding first slot. When it is necessary to switch polarities, squeeze the elastic arm 51 such that the intermediate panel 5 and the pull rod 6 are disengaged from the upper cover panel 3 and the lower cover panel 4, and then rotate the rear casings 2 and the front casings 1 by 180 degrees, and finally install the intermediate panel 5 and the pull rod 6 from an outer side of the lower cover panel 4 opposite to the inner side thereof, thereby completing the switching of polarities; if switching is again required, perform the same method steps above, only with the intermediate panel 5 and the pull rod 6 installed oppositely from an outer side of the upper cover panel 3 opposite to the inner side thereof this time. Since it is not required to disassemble the upper cover panel 3 and the lower cover panel 4, the LC duplex connector is prevented from damage. Also, switching is simple and easy and saves time and effort.

Figure 11:
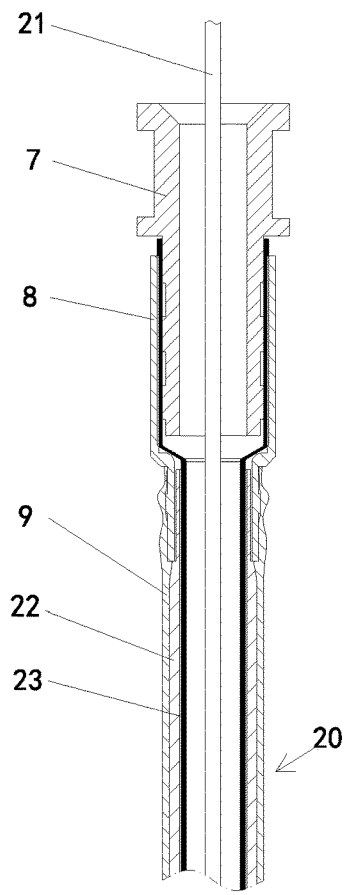
FIG. 11 illustrates a press structure of the tail portion of the LC duplex connector of the present invention according to the first embodiment.

In the current embodiment, as shown in FIG. 11, the LC duplex connector also comprises a stop ring 7, a crimp ring 8 and a heat-shrink tube 9; a second slot 43 is defined by the inner side of the upper cover panel 3 and the inner side of the lower cover panel 4 at an end of the inner side of the upper cover panel 3 and at an end of the inner side of the lower cover panel 4 opposite to the first slots (parts of the inner side of the upper cover panel 3 defining the second slot are not shown); the stop ring 7 is fixed inside the second slot 43; one end of the crimp ring 8 is pressed against a tail part of the stop ring 7, another end of the crimp ring 8 is pressed against an optical cable outer sheath 22; the heat-shrink tube 9 sleeves the crimp ring 8 and the optical cable 20; craft wires 23 of the optical cable 20 extend to positions between the stop ring 7 and the crimp ring 8; crimping and heat-shrinking structures as described above can more securely ensure that a greater pulling force can be endured between the optical cable 20 and the stop ring 7.

Figure 12:
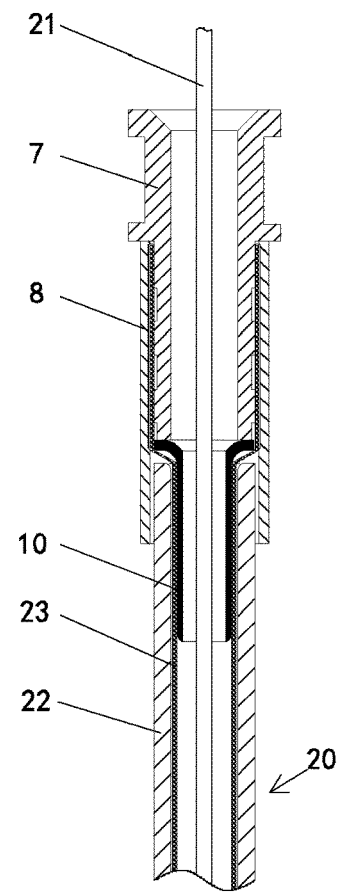
FIG. 12 illustrates a press structure of the tail portion of the LC duplex connector of the present invention according to the second embodiment.

A second embodiment of the LC duplex connector of the present invention as shown in FIG. 12 is different from the first embodiment in that the LC duplex connector comprises a stop ring 7, a crimp ring 8 and a hollow metal tube 10; a second slot is defined by the inner side of the upper cover panel 3 and the inner side of the lower cover panel 4 at an end of the inner side of the upper cover panel 3 and at an end of the inner side of the lower cover panel 4 opposite to the first slots; the stop ring is fixed in the second slot; the hollow metal tube 10 is disposed between optical cable craft wires 23 and a fiber core 21; one end of the crimp ring 8 presses against a tail part of the stop ring 7, another end of the crimp ring 8 presses against an optical cable outer sheath 22, the craft wires 23 and the hollow metal tube 10; the craft wires 23 extend to positions between the stop ring 7 and the crimp ring 8. The hollow metal tube 10 can provide better protection to the fiber core 21 during pressing and connecting process, therefore the press strength between the crimp ring 8 and the hollow metal tube 10 can increase, which in turns provide more secured pressing between the optical cable outer sheath 22 and the craft wires 23. According to experiments, greater pulling force can be endured between the optical cable 20 and the stop ring 7.

The above description illustrates some preferred embodiments of the present invention; the embodiments as described are not intended to limit the present invention. Any changes, modifications and replacements that achieve equivalent technical effects, made within the concept and spirit of the present invention should also fall within the scope of protection of the present invention.

What is claimed is:

1. An LC duplex connector, comprising front casings, rear casings, an upper cover panel and a lower cover panel; each of the front casings is provided with a press strip; a fastening point is provided on the press strip; wherein the LC duplex connector also comprises an intermediate panel and a pull rod; a first through hole and a second through hole are provided on the upper cover panel and the lower cover panel respectively; an elastic arm corresponding to the first through hole and the second through hole is provided on the intermediate panel; the elastic arm is inserted into the first through hole and the second through hole so that the intermediate panel is fixed with respect to the upper cover panel and the lower cover panel; the pull rod is installed on the intermediate panel and is axially slidable; the press strip is provided with a reverse hook; the pull rod is provided with pulling hooks each being cooperative with a corresponding reverse hook.

2. The LC duplex connector of claim 1, wherein the intermediate panel is also provided with a press block to prevent upward deflection of the pulling hooks during movement of the pulling hooks; a surface of the press block in contact with the pulling hooks has a curved shape.

3. The LC duplex connector of claim 1, wherein the intermediate panel is also provided with an abutment portion and a locking portion; the pull rod is also provided with a third through hole; the intermediate panel is inserted into the third through hole, so that the pull rod is connected between the abutment portion and the locking portion.

4. The LC duplex connector of claim 1, wherein the rear casings are rotatably fixed between the upper cover panel and the lower cover panel; the LC duplex connector has only one tail sleeve.

5. The LC duplex connector of claim 4, wherein first slots are defined by an inner side of the upper cover panel and an inner side of the lower cover panel; a tail part of each of the rear casings is a rotary part which is rotatably fixed to a corresponding first slot.

6. The LC duplex connector of claim 5, wherein the LC duplex connector also comprises a stop ring, a crimp ring and a heat-shrink tube; a second slot is defined by the inner side of the upper cover panel and the inner side of the lower cover panel at an end of the inner side of the upper cover panel and at an end of the inner side of the lower cover panel opposite to the first slots; the stop ring is fixed inside the second slot; one end of the crimp ring is pressed against a tail part of the stop ring, another end of the crimp ring is pressed against an optical cable outer sheath; the heat-shrink tube sleeves the crimp ring and the optical cable; craft wires of the optical cable extend to positions between the stop ring and the crimp ring.

7. The LC duplex connector of claim 5, wherein the LC duplex connector also comprises a stop ring, a crimp ring and a hollow metal tube; a second slot is defined by the inner side of the upper cover panel and the inner side of the lower cover panel at an end of the inner side of the upper cover panel and at an end of the inner side of the lower cover panel opposite to the first slots; the stop ring is fixed in the second slot; the hollow metal tube is disposed between optical cable craft wires and an optical fiber core; one end of the crimp ring presses against tail part of the stop ring, another end of the crimp ring presses against an optical cable outer sheath, the craft wires and the hollow metal tube; the craft wires extend to positions between the stop ring and the crimp ring.

8. The LC duplex connector of any one of claims 1-7, wherein the front casings are fixed with respect to the rear casings via grooves and projections; each of the front casings is provided with an insertion core inside; the insertion core comprises a ceramic sleeve tube and a tail; the ceramic sleeve tube positions and fixes an optical fiber core; the insertion core is pressed tightly against the front casing by a corresponding rear casing via a spring.

9. The LC duplex connector of claim 1, wherein the upper cover panel is fixed with respect to the lower cover panel via grooves and projections.

10. The LC duplex connector of claim 1, wherein the insertion core is sleeved with a dust proof cap.

\* \* \* \* \*